US005624586A

United States Patent [19]

Sobr et al.

[11] Patent Number: 5,624,586

[45] Date of Patent: Apr. 29, 1997

[54] ALIGNMENT DEVICE AND METHOD FOR A PLASMA ARC TORCH SYSTEM

[75] Inventors: John Sobr, Lebanon, N.H.; Nicholas A. Sanders, Norwich, Vt.

[73] Assignee: Hypertherm, Inc., Hanover, N.H.

[21] Appl. No.: 368,329

[22] Filed: Jan. 4, 1995

[51] Int. Cl.$^6$ .................................................. B23K 10/00

[52] U.S. Cl. ................................ 219/121.48; 219/121.5; 219/75; 279/905

[58] Field of Search ......................... 219/121.48, 121.36, 219/121.5, 75, 137 R; 279/2.06, 2.23, 905; 483/20, 902, 15, 69; 266/71

[56] References Cited

U.S. PATENT DOCUMENTS

| | | | |
|---|---|---|---|
| 3,459,376 | 8/1969 | Haase et al. | 239/132.3 |
| 3,489,876 | 1/1970 | Haase et al. | 219/75 |
| 3,571,556 | 3/1971 | Wustner | 219/121 |
| 3,725,635 | 4/1973 | Fink et al. | 219/121 P |
| 3,767,218 | 10/1973 | Linthicum et al. | 279/75 |
| 4,363,443 | 12/1982 | Huehne | 239/79 |
| 4,559,439 | 12/1985 | Camacho et al. | 219/121.52 |
| 4,580,032 | 4/1986 | Carkhuff | 219/121 |
| 4,624,043 | 11/1986 | Bennett | 29/568 |
| 4,688,722 | 8/1987 | Dellassio et al. | 239/81 |
| 4,716,271 | 12/1987 | Hulsizer et al. | 219/125.11 |
| 4,739,147 | 4/1988 | Meyer et al. | 219/121 |
| 4,853,515 | 8/1989 | Willen et al. | 219/121.47 |
| 4,861,963 | 8/1989 | Wallner | 219/121.48 |
| 4,864,099 | 9/1989 | Cusick, III et al. | 219/137.62 |
| 4,919,334 | 4/1990 | Hartmann et al. | 239/600 |
| 4,939,339 | 7/1990 | Folkening et al. | 219/137.63 |
| 5,074,802 | 12/1991 | Gratziani et al. | 439/192 |
| 5,101,088 | 3/1992 | Andersson et al. | 219/121.45 |
| 5,192,844 | 3/1993 | Todd et al. | 219/85.16 |
| 5,225,657 | 7/1993 | Blankenship | 219/121.48 |
| 5,258,599 | 11/1993 | Moerke | 219/121.48 |
| 5,326,113 | 7/1994 | Montalvo, II et al. | 279/2.09 |
| 5,328,516 | 7/1994 | Dietiker | 118/723 DC |
| 5,409,164 | 4/1995 | Delzenne et al. | 239/79 |
| 5,409,322 | 4/1995 | Horikawa et al. | 403/328 |

FOREIGN PATENT DOCUMENTS

| | | |
|---|---|---|
| 0079019 | 5/1983 | European Pat. Off. . |
| 0451072 | 10/1991 | European Pat. Off. . |
| 0599709 | 6/1994 | European Pat. Off. . |
| 1118374 | 5/1989 | Japan . |
| WO91/04122 | 4/1991 | WIPO . |
| WO92/17310 | 10/1992 | WIPO . |

OTHER PUBLICATIONS

International Search Report dated May 22, 1996 for the corresponding PCT Application No. PCT/US95/16548.

Service Information Brochure of W.A. Whitney Corp., "Electrode Holder Assembly", No. IC-300, Release Date Oct. 1984.

*Primary Examiner*—Mark H. Paschall
*Attorney, Agent, or Firm*—Testa, Hurwitz & Thibeault, LLP

[57] ABSTRACT

An alignment device and method for a plasma arc torch system which corrects the position of a torch in relation to the receptacle for a successful union. The device and method mechanically align in situ electrical contacts, gas, and water conduits of the torch during a torch change. The time expended for a torch charge is reduced because the torch is self aligning to the receptacle. Minimal human interaction is required to change a torch.

16 Claims, 3 Drawing Sheets

ALIGNMENT DEVICE AND METHOD FOR A PLASMA ARC TORCH SYSTEM

FIELD OF THE INVENTION

The invention relates generally to the field of plasma arc torch systems. In particular, the invention relates to a plasma arc torch cutting system, various components utilized for such a system, and a process for changing a torch in such a system.

BACKGROUND OF THE INVENTION

Plasma arc torch systems are widely used in the cutting of metallic materials. Such systems include a plasma arc torch mounted to a torch receptacle, an electrode mounted within the torch, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch may be non-reactive, e.g. nitrogen or argon, or reactive, e.g. oxygen or air.

In process of plasma arc cutting of a metallic workpiece, a pilot arc potential (voltage) is first applied between the electrode (cathode) and the nozzle (anode). A voltage generated by a high voltage generator (HFHV) is applied to breakdown the gap between the electrode and the nozzle, allowing a pilot arc to form between the electrode and the nozzle. After the pilot arc is formed, the power supply initiates the transfer of the arc to the workpiece. The torch is operated in this transferred plasma arc mode, characterized by the conductive flow of ionized gas from the electrode to the workpiece, for the cutting of the workpiece.

Plasma arc cutting torches produce a transferred plasma jet with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches also have a thinner heat affected zone and are more effective in producing a dross free cut and blowing away molten metal.

In operation, high definition torches generally require efficient cooling of the nozzle. Liquid cooling has proven effective in achieving the required degree of cooling. In various high definition plasma arc torch systems manufactured by Hypertherm, Inc., a cooling liquid, such as water, circulates through the torch via internal passages and chambers, eventually flowing over portions of the nozzle to cool the nozzle.

Various problems have been found to exist in connection with the operation of plasma arc cutting torch systems. For example, when various consumable parts (e.g., the nozzle and electrode) require replacement, the torch is manually dissembled in a piece by piece manner. More specifically, the torch is disassembled to remove and replace worn consumables. Such changing processes require extensive human involvement and therefore may be time consuming and expensive.

It is therefore a principal object of this invention to provide a plasma arc cutting torch system that facilitates the changing of a torch.

Another principal object is to provide a changing system for a plasma arc cutting torch system that provides for efficient and reliable replacement of the torch.

SUMMARY OF THE INVENTION

Generally, the present invention features a self-aligning plasma arc torch system comprising a torch and a torch receptacle for capturing and releasing the torch. The torch receptacle includes at least two ports each dimensioned to receive an alignment pin on the torch. The pins each have a first end coupled to the torch and a distal end with a rounded edge, such that the pins are readily insertable into the ports in the torch receptacle. The pins align the torch relative to the receptacle as the torch is being inserted into the receptacle.

The alignment pins may include a conduit extending through the center of the pin and which carries a liquid or a gas. In addition, the pins may be used to electrically connect the torch to the receptacle. More specifically, the pins may include an electrically conducting outer surface and the corresponding port formed in the receptacle includes at least one electrical contact such that the outer surface of the pin and the receptacle port contact form an electrically conductive path. The electrically conductive outer surface and the receptacle port contact may be water immersible.

A gross positioning guide comprising a beveled edge formed on the receptacle and a mated beveled edge formed on the torch, may be used to initially align the torch to the receptacle. Further, a pneumatically actuated ball chuck may be used for locking the torch in a fixed position within the receptacle.

A ring having a code may be positioned around the torch to provide identification of current capacity of consumables. An example of such a ring is a cylinder having a plurality of apertures positioned thereon to form a binary code. When a torch change is required, the controller instructs a mechanical apparatus to select a fresh torch. A sensor connected to the controller reads the code on each torch in the rack to select a fresh torch that matches the desired code in the rack.

The present invention also features a method of mounting a plasma arc torch to a torch receptacle. The method includes moving a torch into initial contact with a torch receptacle. The torch is rotationally and translationally aligned relative to the torch receptacle by inserting at least two alignment pins coupled to an end of the torch into at least two ports in the torch receptacle. The end of the torch is inserted into the torch receptacle. Finally, a locking mechanism (e.g., a ball chuck mechanism) disposed on the receptacle is engaged securing the torch to the receptacle.

The method may also include positioning the torch relative to the torch receptacle by either moving the storage rack or moving the receptacle. The method may also include gross translationally aligning the torch relative to the torch receptacle by engaging a beveled edge on the receptacle with a mated beveled edge on the torch.

In addition, the present invention features a method of changing a plasma arc torch including the steps of (i) positioning a plasma arc torch adjacent an empty position in a storage rack, (ii) dis-engaging a locking mechanism thereby unlocking the torch from the receptacle, (iii) separating the torch from the torch receptacle and moving the torch into the storage rack, and (iv) positioning a second torch in initial contact with the torch receptacle. The second torch is then mounted using the method of mounting a plasma arc torch to a receptacle described above.

A self-aligning plasma arc torch incorporating the principles of the present invention offers significant advantages in automated torch cutting systems. One advantage is that in the present method the torch corrects its position in relation to the receptacle for a successful union. Another advantage is the ability to mechanically align in situ electrical contacts, gas, and water conduits during a torch change in accordance with the present method. Another advantage is that the present method reduces the time expended for a torch change and requires minimal human interaction.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION

Figure 1:
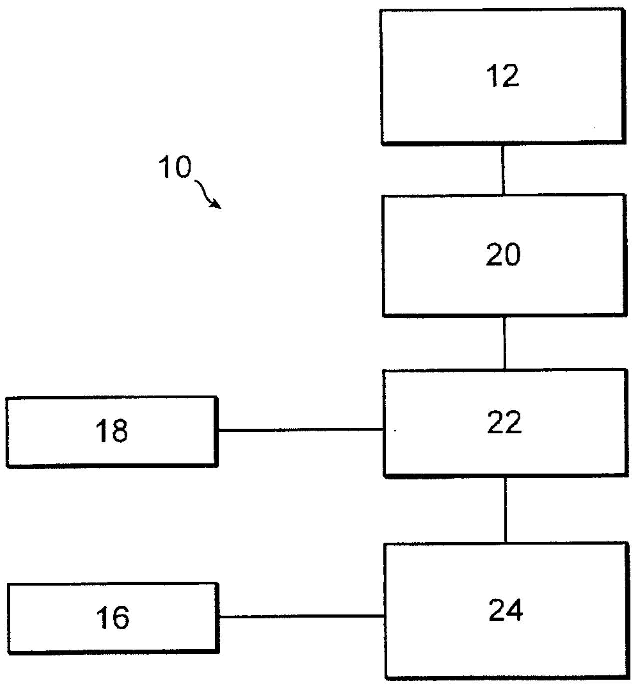
FIG. 1 is a representative high definition plasma arc torch system incorporating the principles of the invention.

FIG. 1 illustrates a representative high definition plasma arc torch system 10 incorporating the principles of the invention. The system includes a controller 12, a storage rack 16, a power supply 18, a mechanical apparatus 20 including a Z-axis motor, a torch receptacle 22, and a torch 24. The power supply includes a high frequency high voltage (HFHV) generator which provides a signal to the torch during the starting process. The torch is removably mounted to the receptacle, which is coupled to the mechanical apparatus and used to capture and release the torch. The mechanical apparatus positions and moves the torch receptacle and torch horizontally for subsequent piercing and cutting.

The storage rack 16 provides a storage location for additional torches containing either unworn, or spent consumables. Generally, there are several torches in a rack and available for use. The process of changing a torch having worn consumables is described in detail below.

Figure 2:
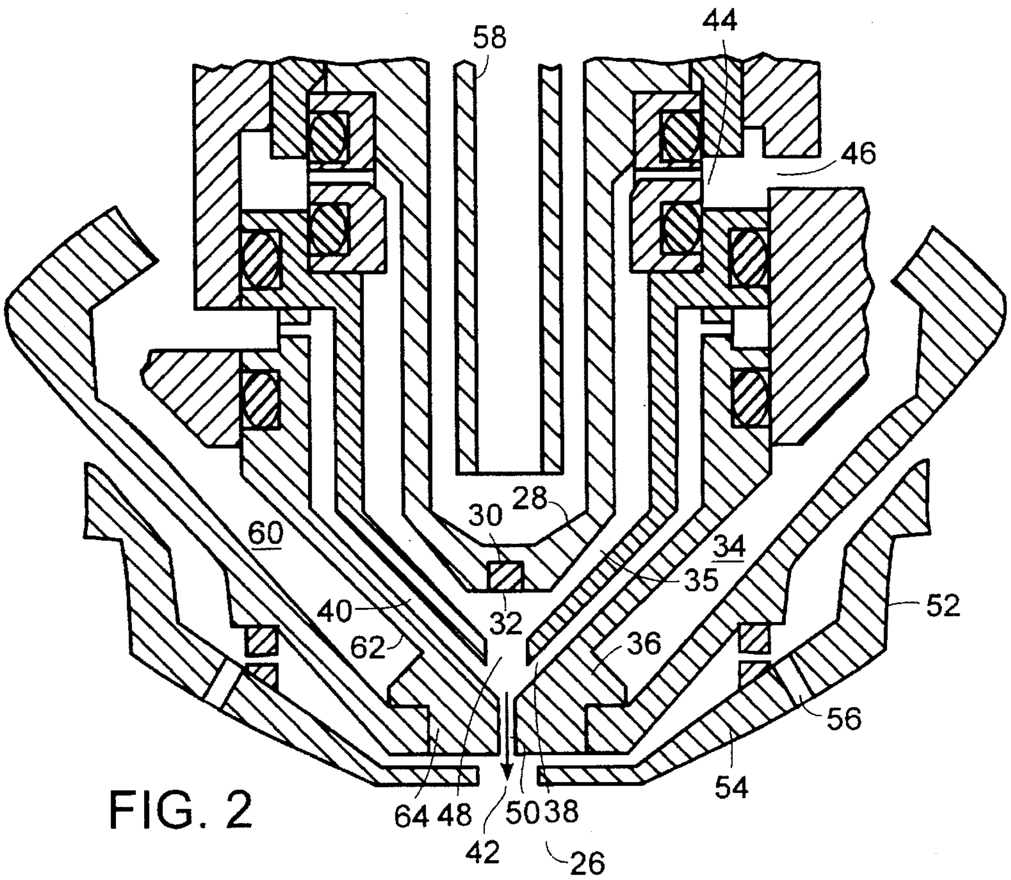
FIG. 2 is a partial cross-sectional view of the front end of the torch for the high definition plasma arc torch shown in FIG. 1.

FIG. 2 is a partial cross-sectional view of the front end 26 of the torch 24 for the high definition plasma arc torch 14 shown in FIG. 1. The torch pierces and cuts metal, particularly mild steel, in a transferred arc mode and may be used to pierce, cut and shape other materials. In cutting mild steel, it operates with oxygen or air as the plasma gas to form a transferred arc. An electrode 28, typically formed of copper, has an insert 30 press fit into its lower end 32. The arc is highly constricted and has a current density of about 60,000 amperes/inch$^2$.

The front end of the torch includes a nozzle 34 having an inner piece 35 and an outer piece 36 with a flow path 38 formed therebetween to divert away a portion 40 of the plasma gas flow 42. The nozzle is of the general type described in U.S. Pat. No. 5,317,126, assigned to Hypertherm, Inc. A swirl ring 44 has canted ports 46 that impart a swirl to the plasma gas flow. This swirl creates a vortex that constricts and stabilizes the arc. The diversion of a portion of the plasma gas flow ensures a strong vortex flow through a plasma arc chamber 48 despite the relatively small cross sectional area of the nozzle exit orifice 50 at the outer nozzle piece. This strong vortex flow stabilizes the position of the arc on the insert.

A nozzle shield 52 guides a flow 54 of a secondary gas onto the arc. During cutting, the secondary gas flow rate is reduced so as not to destabilize the arc. The shield 52 includes bleed ports 56 angled away from the arc. The shield and the secondary gas flow protect the nozzle against molten metal splattered onto the nozzle from the workpiece which may produce gouging or double arcing. The shield is conductive, but mounted to insulating outer portion of the torch to be electrically floating and thereby resist double arcing. The shield operates in accordance with U.S. Pat. No. 4,861,962, assigned to Hypertherm, Inc.

The electrode 28 is hollow with a water inlet tube 58 extending down into the electrode. The cooling water circulates through the torch via internal passages to a water cooling chamber 60 where the water flows over the lower portion 62 of the nozzle to cool the nozzle, particularly the walls of the nozzle orifice 50. The tip 64 of the nozzle is thickened to provided mechanical strength and formed of a material having good thermal conductivity, such as copper, to serve as a heat sink.

Figure 3A:
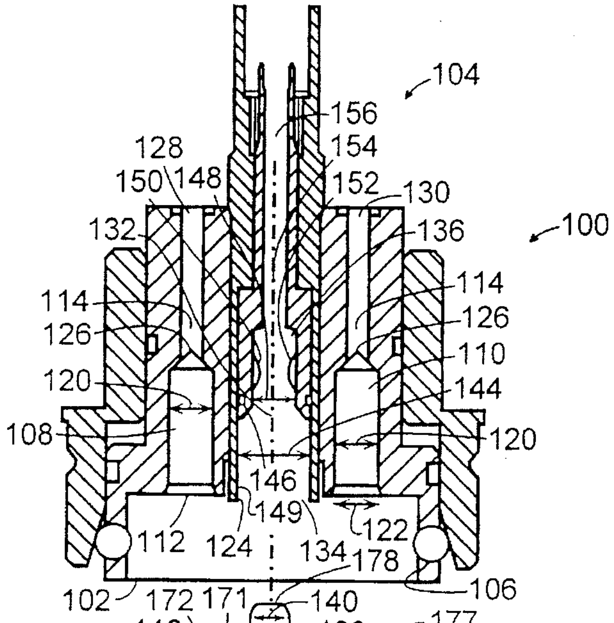
FIG. 3A illustrates a cross section of a torch receptacle for a high definition plasma arc torch system incorporating the principles of the invention.
Figure 3B:
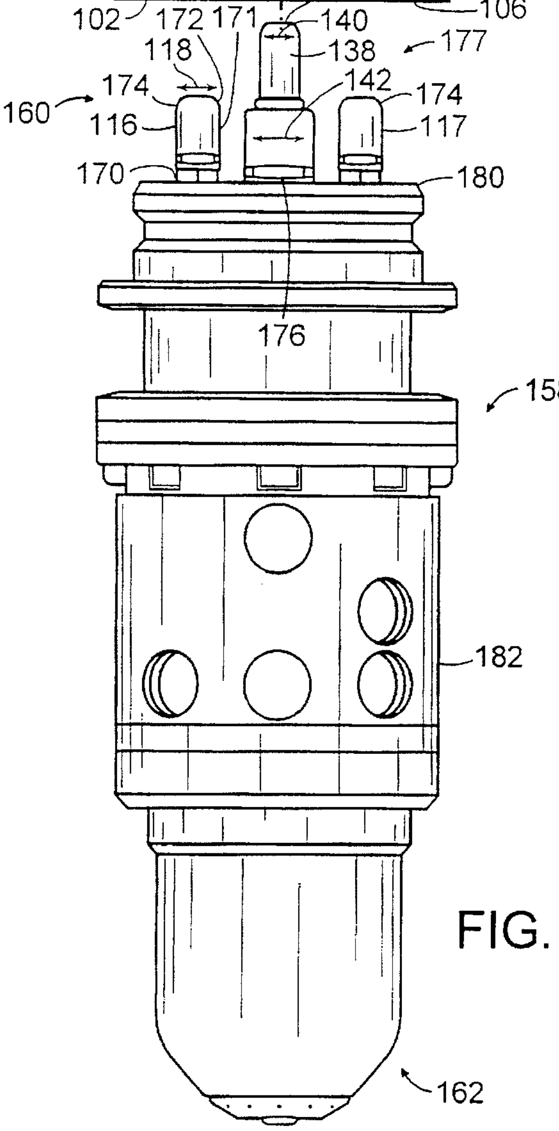
FIG. 3B illustrates a front view of a torch for a high definition plasma arc torch system incorporating the principles of the invention.
Figure 3C:
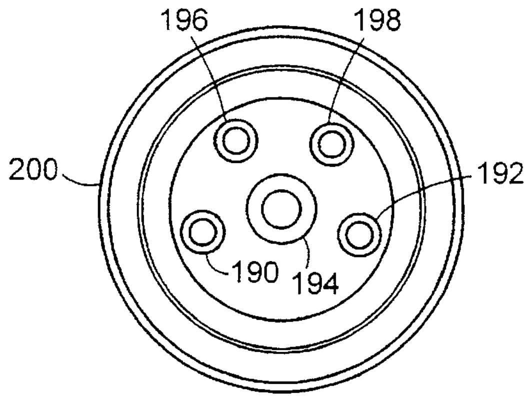
FIG. 3C illustrates a top view of a torch for a high definition plasma arc torch system incorporating the principles of the invention.

FIGS. 3A–3C illustrate various views of one embodiment of a torch and receptacle pair. FIG. 3A illustrates a cross section of a torch receptacle 100 having a receiving end 102 and a top 104. A gross positioning guide 106 on the surface of a receiving end is used to initially align the torch to the receptacle. The gross positioning guide may be a beveled edge on the surface of the receiving end of the receptacle. A pneumatically actuated locking mechanism such as a ball chuck mechanism may be used for locking the torch in a fixed position within the receptacle.

A first 108 and a second 110 port having a receiving end 112 and a top 114 are dimensioned to receive a first 116 and a second 117 elongated alignment pin (FIG. 3B) having a pin diameter 118. In this embodiment, the ports are cylindrical with a port diameter 120 which is slightly larger than the pin diameter. The surface of the receiving end of the port has a surface diameter 122 larger than the port diameter so as to allow the pins to more easily enter when there are slight misalignments of the pin to the port. The surface diameter tapers to the port diameter at a distance 124. The top 114 of the port has an aperture 126 that allows a gas or a liquid (not shown) to pass through the port. A first 128 and a second 130 receptacle conduit attaches the top of the port 114 to the top of the receptacle 104 so as to allow the liquid or gas which passes through the first and second apertures to pass out of the receptacle.

A center port 132 having a receiving end 134 and a top 136 is dimensioned to receive a center pin 138 (FIG. 3B) having a first 140 and a second 142 center pin diameter. The receiving end has a first diameter 144 which is slightly greater than the second center pin diameter 142. At a distance 146 from the receiving end, the center port tapers to a second diameter 148 which is slightly larger than the first center pin diameter 140. The surface of the second diameter has a rounded edge 149 so as to allow the center pin to more easily enter when there is a slight misalignment of the center pin to the center port. The center port may also have a first 150 and a second 152 electrical contact facing the center pin 138. The top of the center port has an aperture 154 that allows a gas or a liquid (not shown) to pass through the center port. A center receptacle conduit 156 attaches the top of the center port to the top of the receptacle so as to allow a liquid or a gas (not shown) to pass through the receptacle.

FIG. 3B illustrates a front view of a torch 158 having a receiving end 160 and a nozzle end 162. A first 116 and a second 117 elongated alignment pin having a pin diameter 118 are used to align the torch to the receptacle 100 (FIG. 3A) while the torch is being inserted into the receptacle. The pin diameter is slightly smaller than the port diameter 120 (FIG. 3A) so as to allow the pin to insert into the port. The pins each have a first end 170 coupled to the torch, an elongated section 171, and a distal end 172 with rounded edges 174. The rounded edges on the pins reduces the alignment tolerance required to insert the alignment pins into the ports.

A center alignment pin having a first end 176 coupled to the torch, an elongated section 177, and a distal end 178 with rounded edges is used to align the torch to the receptacle 100 (FIG. 3A). The rounded edges on the distal end reduce the alignment tolerance required to insert the alignment pin into the center port. In addition, the rounded edges reduce wear on the first and second electrical contacts within the center port. The center pin has a first diameter 140 slightly smaller than the center port second diameter 148 so as to allow the first diameter of the center pin 140 to be inserted into the center port. At a distance 146 from the distal end 178, the center pin transitions to a larger second diameter 142 which is slightly smaller than the first center port diameter so as to allow the center pin second diameter 142 to be inserted into the center port first diameter 144.

The first, second, and center alignment pins may have a conduit through the center of the pin (not shown) that will allow a gas or a liquid to pass through the pins. Such a conduit will allow a gas or liquid to pass from the top of the receptacle to the torch. In addition, the center alignment pins may have an electrically conducting outer surface (not shown) so as to form an electrical connection between the center pin and the first 150 and second 152 center port contact. Flowing a liquid through the center pin will cool the electrically conducting outer surface and the first and second contact and thus allow the use of smaller electrical contacts.

Additional alignment pins and ports (not shown) may be used to further improve alignment of the torch to the receptacle while the torch is being inserted into the receptacle. Moreover, additional alignment pins and ports will allow further electrical connections and gas and liquids conduits between the receptacle and the torch.

A gross positioning guide 180 is used to initially align the torch to the receptacle. The gross positioning guide may be a beveled edge on the torch which mates to the beveled edge on the surface of the receiving end of the receptacle 106.

The torch may also include a ring 182 positioned around the torch having a code to provide identification of current capacity of consumables. The torch illustrated in FIG. 3B includes a ring with a plurality of apertures positioned so as to form a binary code readable by a sensor (not shown) connected to the controller 12 (FIG. 1). The controller instructs the mechanical apparatus to exchange a spent torch attached to the receptacle with a fresh torch in the storage rack 16 (FIG. 1) that matches the desired current level.

FIG. 3C illustrates a top view of the receiving end of the torch. A top view of the first 190, second 192, and center 194 alignment pins are shown. In addition, a top view of a third 196 and a fourth 198 alignment pin similar to the first and second alignment pin are shown. Each alignment pin is shown with a center conduit for carrying a liquid or a gas (not shown). The center alignment pin has an electrically conducting outer surface. A top view of a gross positioning guide 200 for aligning the torch to the receptacle having a beveled edge on the torch is shown.

Figure 4:
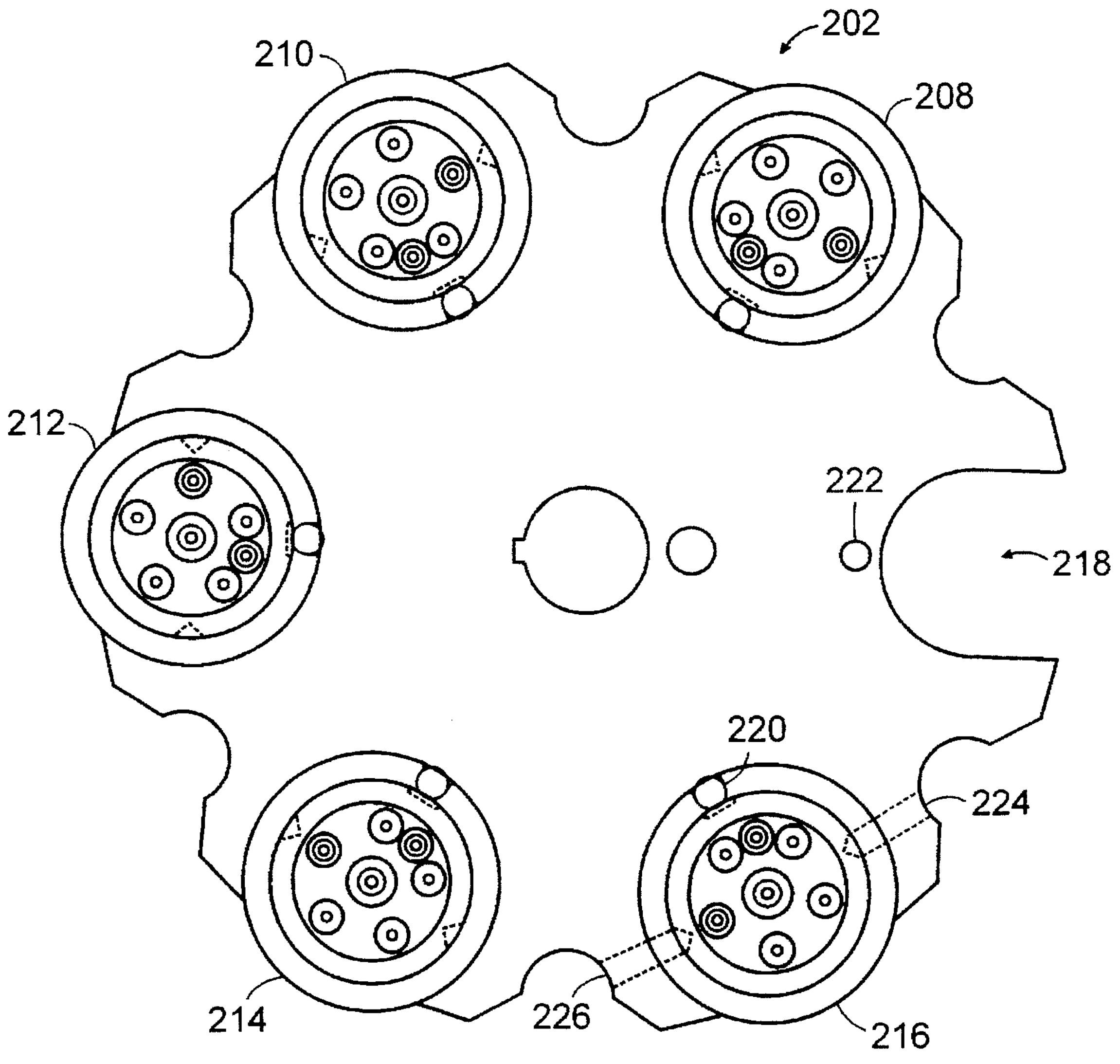
FIG. 4 illustrates a top view of a storage rack holding torches for a high definition plasma arc torch system incorporating the principles of the invention.

FIG. 4 illustrates a top view of a storage rack 202 containing multiple torches for a high definition plasma arc torch system incorporating the principles of the invention. The storage rack provides a storage location for torches containing either unworn, or spent consumables. In this embodiment, the storage rack is circular and rotatable in either a clockwise or a counterclockwise direction. While a rotatable rack is shown, a stationary linear rack may also be used. A first 208, second 210, third 212, fourth 214, and fifth 216 torch are shown in the storage rack. An empty position 218 in the storage rack is aligned to receive a spent torch from the mechanical apparatus.

Each torch includes a slot pin 220 which mates to a key pin 222 in the storage rack. The pin ensures that the torch is properly positioned in the storage rack. A first 224 and a second 226 fastener securely hold the torches in proper position within the storage rack. In this embodiment, the fastener is a spring loaded probe.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A self-aligning plasma arc torch comprising:

a torch body including an electrode and a nozzle having a central orifice for a plasma arc;

a torch receptacle for capturing and releasing the torch body including at least two ports each dimensioned to receive an alignment pin;

at least two alignment pins each having a distal end with a rounded edge, the pins being coupled to an end of the torch body and insertable into the ports for aligning the torch relative to the receptacle, at least one pin including at least one aperture extending through the center of the alignment pin for carrying a fluid; and a gross positioning guide for initially aligning the torch relative to the torch receptacle, the guide includes a beveled edge on the receptacle and a beveled mating edge on the torch.

2. The torch of claim 1 further comprising a pneumatically actuated ball chuck for locking the torch in a fixed position within the receptacle.

3. The torch of claim 1 further comprising:

at least one alignment pin having an electrically conducting outer surface, an end coupled to the torch, and a distal end with a rounded edge such that the pin is insertable into a center port; and at least one port having an electrical contact electrically connected to the outer surface of at least one alignment pin for forming an electrically conductive path.

4. The torch of claim 1 wherein at least one alignment pin includes a conduit through the center of such pin for carrying a liquid or a gas.

5. The torch of claim 1 wherein at least one alignment pin has an electrically conducting outer surface and at least one port has an electrical contact, the outer surface of the alignment pin and the electrical contact on the port form an electrically conductive path.

6. The torch of claim 1 wherein the torch further comprises an identification ring surrounding the torch and having a plurality of apertures to form a binary code.

7. A method of mounting a plasma arc torch to a torch receptacle comprising:

moving a torch into initial contact with a torch receptacle;

gross translationally aligning the torch relative to the torch receptacle by engaging a beveled edge on the receptacle and a beveled edge on the torch;

aligning the torch relative to the receptacle by inserting at least two alignment pins into at least two ports in the torch receptacle, each pin having a distal end with a rounded edge and being coupled to an end of the torch, at least one pin including at least one aperture extending through the center of the alignment pin for carrying a fluid;

inserting the end of the torch into the torch receptacle; and engaging a locking mechanism disposed on the receptacle for securing the torch to the receptacle.

8. The method of claim 6 further comprising using a linear drive motor for moving the torch into contact with the torch receptacle.

9. The method of claim 6 wherein the locking mechanism is a ball chuck mechanism.

10. The method of claim 6 wherein the torch is rotationally and translationally aligned relative to the receptacle.

11. A method of changing a plasma arc torch mounted to a torch receptacle comprising:

positioning a plasma arc torch into an empty position in a storage rack;

dis-engaging a locking mechanism disposed on the torch receptacle to unlock the torch from the receptacle;

moving the torch away from the torch receptacle and into the storage rack;

positioning a second torch in initial contact with the torch receptacle;

gross translationally aligning the second torch relative to the torch receptacle by engaging a beveled edge on the receptacle and a beveled edge on the second torch;

aligning the second torch relative to the torch receptacle by positioning at least two alignment pins coupled to the second torch adjacent at least two ports in the torch receptacle, at least one pin including at least one aperture extending through the center of the alignment pin for carrying a fluid;

inserting the second torch fully into the torch receptacle; and engaging the locking mechanism to secure the second torch to the receptacle.

12. The method of claim 11 further comprising moving the storage rack such that a second torch is positioned in initial contact with the torch receptacle.

13. The method of claim 11 further comprising moving the receptacle such that a second torch is positioned in initial contact with the torch receptacle.

14. The method of claim 11 wherein the locking mechanism is a ball chuck mechanism.

15. The method of claim 11 wherein the second torch is rotationally and translationally aligned relative to the receptacle.

16. A self-aligning plasma arc torch comprising:

a torch including an electrode and a nozzle having a central orifice for a plasma arc;

a torch receptacle for capturing and releasing the torch including at least two ports each dimensioned to receive an alignment pin;

a gross positioning guide comprising a beveled edge formed on the receptacle and a mated beveled edge formed on the torch to initially align the torch to the receptacle;

at least two alignment pins each having a distal end with a rounded edge, the pins are coupled to an end of the torch and are insertable into the ports for aligning the torch relative to the receptacle, the pins including at least one aperture extending through the center of the alignment pin for carrying a fluid; and a locking mechanism for securing the torch to the receptacle.

* * * * *

UNITED STATES PATENT AND TRADEMARK OFFICE
CERTIFICATE OF CORRECTION

PATENT NO. : 5,624,586

DATED : April 29, 1997

INVENTOR(S) : John Sobr and Nicholas A. Sanders

It is certified that error appears in the above-indentified patent and that said Letters Patent is hereby corrected as shown below:

Col. 7, Claim 8, first line, change "claim 6" to ---claim 7---.

Col. 7, Claim 9, first line, change "claim 6" to ---claim 7---.

Col. 7, Claim 10, first line, change "claim 6" to ---claim 7---.

Signed and Sealed this

Twelfth Day of August, 1997

*Attest:*

Bruce Lehman

BRUCE LEHMAN

*Attesting Officer*

*Commissioner of Patents and Trademarks*